US008705886B2

(12) United States Patent
Chung et al.

(10) Patent No.: US 8,705,886 B2
(45) Date of Patent: Apr. 22, 2014

(54) SYSTEM, MEDIUM, AND METHOD COMPENSATING BRIGHTNESS OF AN IMAGE

(75) Inventors: Dae-su Chung, Seoul (KR); Byoung-ho Kang, Yongin-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1606 days.

(21) Appl. No.: 11/898,052

(22) Filed: Sep. 7, 2007

(65) Prior Publication Data

US 2008/0075384 A1 Mar. 27, 2008

(30) Foreign Application Priority Data

Sep. 25, 2006 (KR) .................. 10-2006-0093081

(51) Int. Cl.
*G06K 9/40* (2006.01)
(52) U.S. Cl.
USPC .......................................... 382/274
(58) Field of Classification Search
USPC .......................................... 382/274
See application file for complete search history.

(56) References Cited

U.S. PATENT DOCUMENTS

| 4,963,915 | A | * | 10/1990 | Ikemura et al. ............. 396/61 |
| 4,984,006 | A | * | 1/1991 | Ikemura et al. ............. 396/166 |
| 7,190,844 | B2 | * | 3/2007 | Kobayashi et al. .......... 382/274 |
| 7,825,955 | B2 | * | 11/2010 | Kato ...................... 348/221.1 |
| 2002/0037101 | A1 | | 3/2002 | Aihara |
| 2006/0044459 | A1 | * | 3/2006 | Kato ...................... 348/362 |

FOREIGN PATENT DOCUMENTS

| CN | 1573795 | 2/2005 |
| CN | 1658657 | 8/2005 |
| EP | 1 596 573 A2 | 11/2005 |
| EP | 1 648 156 A2 | 4/2006 |
| EP | 1 703 462 A1 | 9/2006 |
| JP | 2-268080 | 11/1990 |
| JP | 6-189186 | 7/1994 |
| JP | 2001-298660 | 10/2001 |
| JP | 2002-185771 | 6/2002 |
| JP | 2002-258345 | 9/2002 |
| JP | 2002-277922 | 9/2002 |
| JP | 2004-260835 | 9/2004 |
| JP | 2005-260738 | 9/2005 |
| KR | 10-0126453 | 10/1997 |
| WO | 2006/013913 | 2/2006 |

OTHER PUBLICATIONS

Extended European Search Report mailed on Feb. 23, 2009 issued with respect to the Corresponding European Patent Application No. 07116826.4-2218.
Chinese Office Action dated Feb. 24, 2010 issued during the examination of the corresponding Chinese patent application No. 200710161725.9.
Japanese Office Action issued Jun. 19, 2012 in corresponding Japanese Patent Application No. 2007-243815.

* cited by examiner

*Primary Examiner* — Aaron W Carter
(74) *Attorney, Agent, or Firm* — Staas & Halsey LLP

(57) ABSTRACT

A system, medium, and method compensating brightness of an image, by compensating the brightness of a main object included in the image. The system includes a brightness distribution calculation unit dividing the obtained image into a plurality of divided regions and calculating the brightness distribution of each divided region, and a compensation unit determining a main region including a main object in the obtained image according to the calculated brightness distribution and compensating the obtained image according to the determination result.

19 Claims, 8 Drawing Sheets

SYSTEM, MEDIUM, AND METHOD COMPENSATING BRIGHTNESS OF AN IMAGE

CROSS-REFERENCE TO RELATED APPLICATIONS

This application claims priority from Korean Patent Application No. 10-2006-0093081 filed on Sep. 25, 2006 in the Korean Intellectual Property Office, the disclosure of which is incorporated herein by reference in its entirety.

BACKGROUND OF THE INVENTION

1. Field of the Invention

One or more embodiments of the present invention relate to a system, medium, and method compensating the brightness of an image, and more particularly, to a system, medium, and method compensating the brightness of an image, where the brightness of a main object included in the image is compensated.

2. Description of the Related Art

In general, image capturing devices, such as a camera or a camcorder, may perform brightness compensation when a predetermined subject is photographed in an overly illuminated ambient condition or a backlit state. In such a case, the resulting image of the subject will be under-exposed. Accordingly, the image capturing device may compensate the brightness for exposure.

As an example of a method of compensating the brightness of an image, an image capturing device may divide the obtained image into a plurality of areas, and allocate a different weight to each divided area, thereby compensating the brightness. That is, the image capturing device may set an area including the main object, that is, the central object, in a plurality of divided areas, as the main area, and the remaining area as sub-areas. Then, different weights are assigned to the main area and sub-areas, and compensation is performed by using the weighted sum. In such a manner, the brightness of the image is compensated until a target brightness level is reached.

As one approach to overcome the problems associated with the brightness compensation, a main area is predefined and the predefined main area is used irrespective of the area occupied by the main object. However, this technique presents a problem in that it does not take into consideration of the position factor of the main object within an image. That is, when the position of the main object changes, it becomes considerably more difficult to obtain accurate brightness of the main object. Thus, there is a limitation in compensating the brightness of an image until a target brightness level is reached.

Accordingly, there is a need for a system, medium, and method that can accurately compensate the brightness of an image by variably setting the main area in which the main object is positioned according to the position of the main object.

SUMMARY OF THE INVENTION

One or more embodiments of the present invention provides a system, medium, and method compensating the brightness of an image, where the image is divided into a plurality of divided regions and a region in which the main object is positioned in the obtained image is set variably according to the brightness distribution of each divided region, thereby enabling compensation of the brightness of the main object during insufficient exposure.

Additional aspects and/or advantages of the invention will be set forth in part in the description which follows and, in part, will be apparent from the description, or may be learned by practice of the invention.

To achieve the above and/or other aspects and advantages, embodiments of the present invention include a system compensating the brightness of an image, the system including a brightness distribution calculation unit to divide an obtained image into a plurality of divided regions and to calculate a brightness distribution for the plurality of divided regions, and a compensation unit to identify a main region, including one or more regions of the plurality of divided regions, including a main object according to the calculated brightness distribution and to compensate the obtained image according to the identification of the main region.

To achieve the above and/or other aspects and advantages, embodiments of the present invention include a method of compensating brightness of an image, the method including dividing an obtained image into a plurality of divided regions and calculating a brightness distribution for the plurality of divided regions, and identifying a main region, including one or more regions of the plurality of divided regions, including a main object according to the calculated brightness distribution, compensating the obtained image according to the identification of the main region, and outputting the compensated obtained image.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
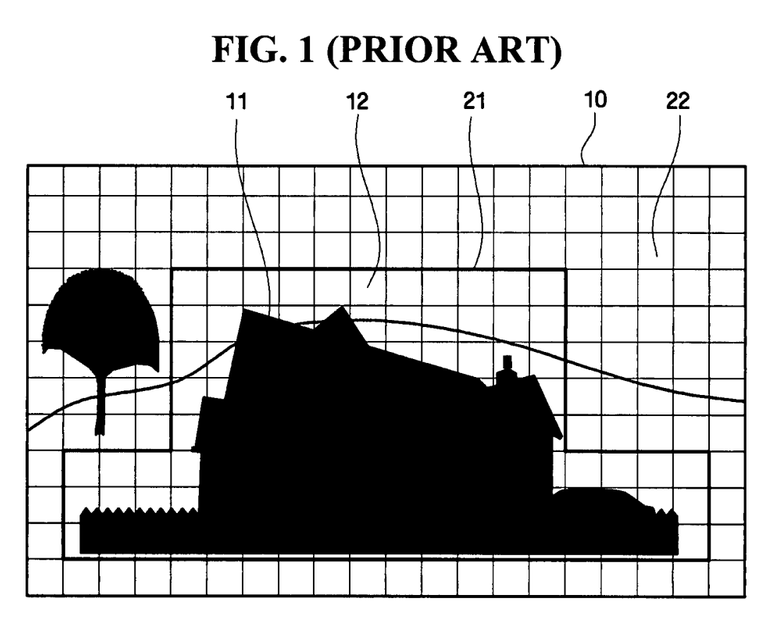
FIG. 1 illustrates a conventional method of dividing fixed regions.
Figure 2:
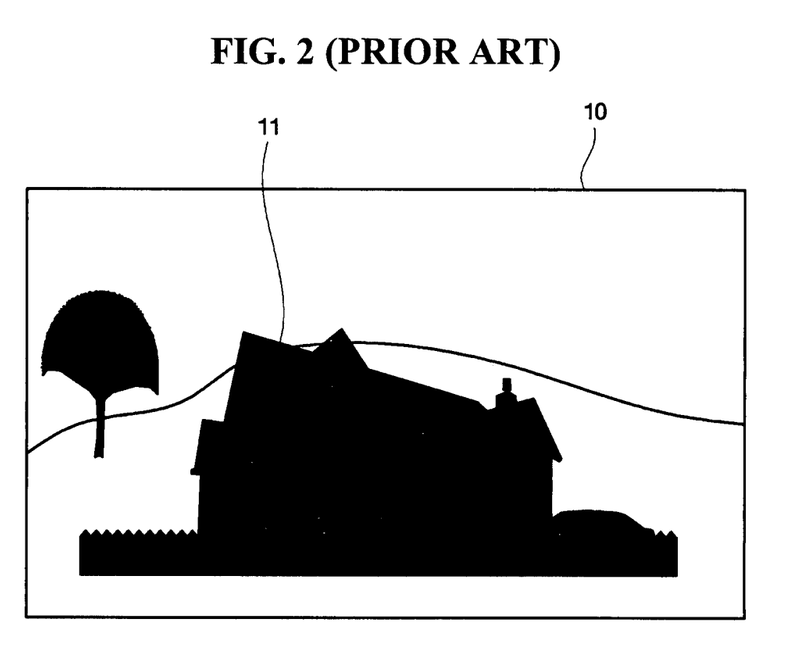
FIG. 2 illustrates an image in which brightness is compensated through the conventional fixed region dividing method shown in FIG. 1.

Generally, in order to compensate brightness of an image 10, predefined areas, irrespective of an eventual area occupied by a main object 11 included in an image 10, may be designated as a main area 21 and a sub-area 22 as illustrated in FIG. 1. Accordingly, the main area 21 may include other objects in addition to the main object 11. Because of this, the accurate brightness of the main object 11 cannot be obtained, and as a result, the brightness of the main object 11 becomes darker as illustrated in FIG. 2.

Accordingly, in a system for compensating brightness of an image, according to an embodiment of the present invention, a main area may be variably set with respect to the position of a main object included in the image in order to obtain accurate brightness of the object. For example, FIG. 3 illustrates a system compensating brightness of an image, according to an embodiment of the present invention.

Figure 3:
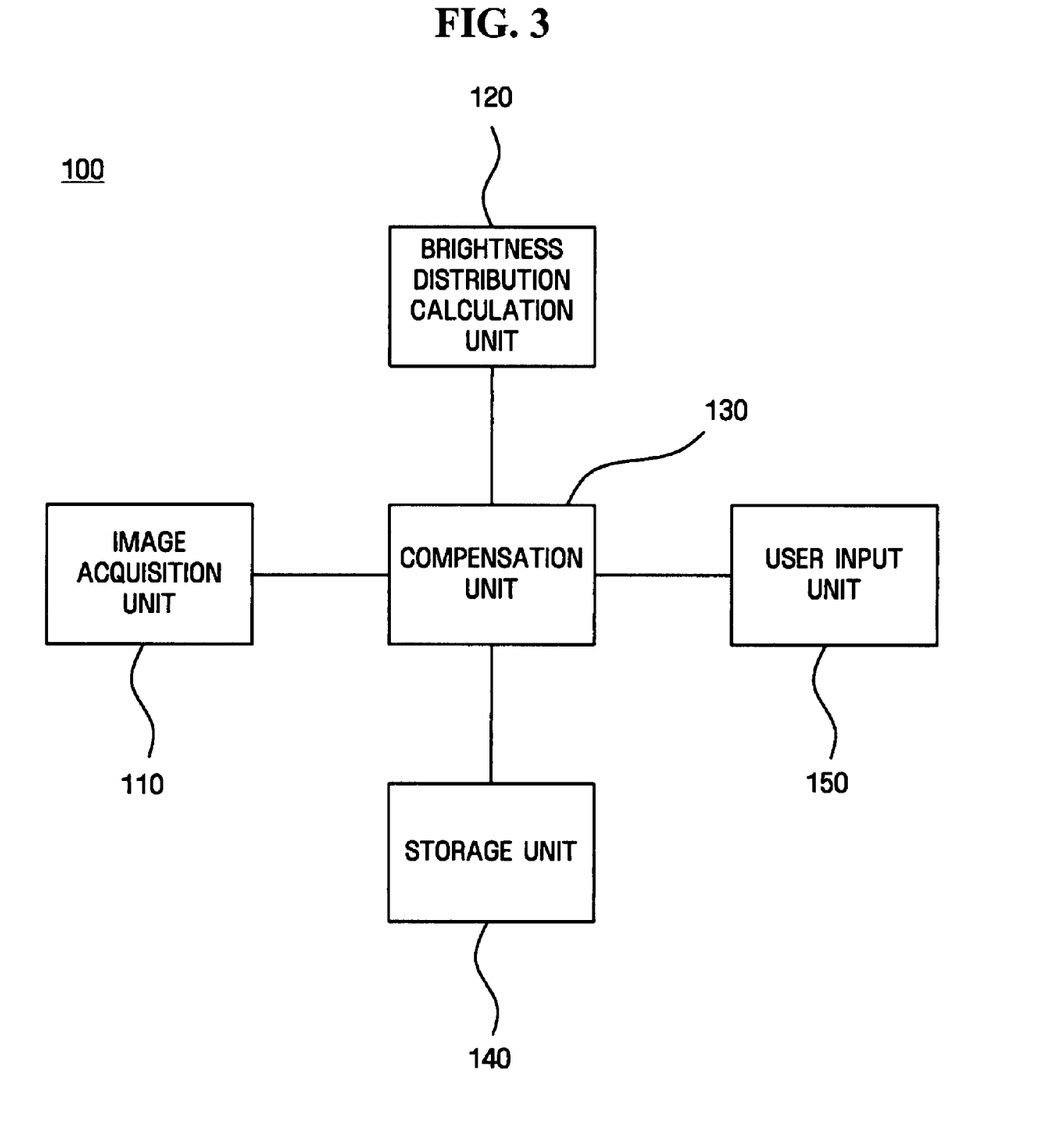
FIG. 3 illustrates a system compensating brightness of an image, according to an embodiment of the present invention.

As illustrated in FIG. 3, the system 100 compensating brightness of an image may include an image acquisition unit 110, a brightness distribution calculation unit 120, a compensation unit 130, a storage unit 140, and a user input unit 150, for example.

In one embodiment, the image acquisition unit 110 may be a charge-coupled device (CCD) or a complementary metal-oxide semiconductor (CMOS) sensor, as an image taking device for obtaining an image of a predetermined subject, for example. Here, the image acquisition unit 110 is not limited to the image taking device, and may be a system capable of taking an image, such as a camera and a camcorder having an image taking device, noting that alternative embodiments are equally available.

Hereinafter, in embodiments of the present invention, a central object, for example, in an image obtained by the image acquisition unit 110 will be referred to as a 'main object', and other objects will be referred to as 'sub objects'. For example, if a house and a tree are in an image obtained by the image acquisition unit 110, and a user, for example, sets the house to be a central object when the image is captured, the main object would be considered to be the house and the sub object would be considered to be the tree. Here, in such an embodiment of the present invention, an area occupied by a main object in an image obtained by the image acquisition unit 110 will be referred to as a 'main region', and an area occupied by sub objects and other backgrounds will be referred to as a 'sub region'.

The brightness distribution calculation unit 120 may divide an image, e.g., obtained by the image acquisition unit 110, into a plurality of divided regions, and calculate a brightness distribution according to the brightness level of each divided region.

Here, in an embodiment, an example where the divided regions have the same size is described, but embodiments of the present invention are not limited thereto, and the divided regions may have different sizes, and may vary with respect to an environment in which an image is obtained.

Figure 4:
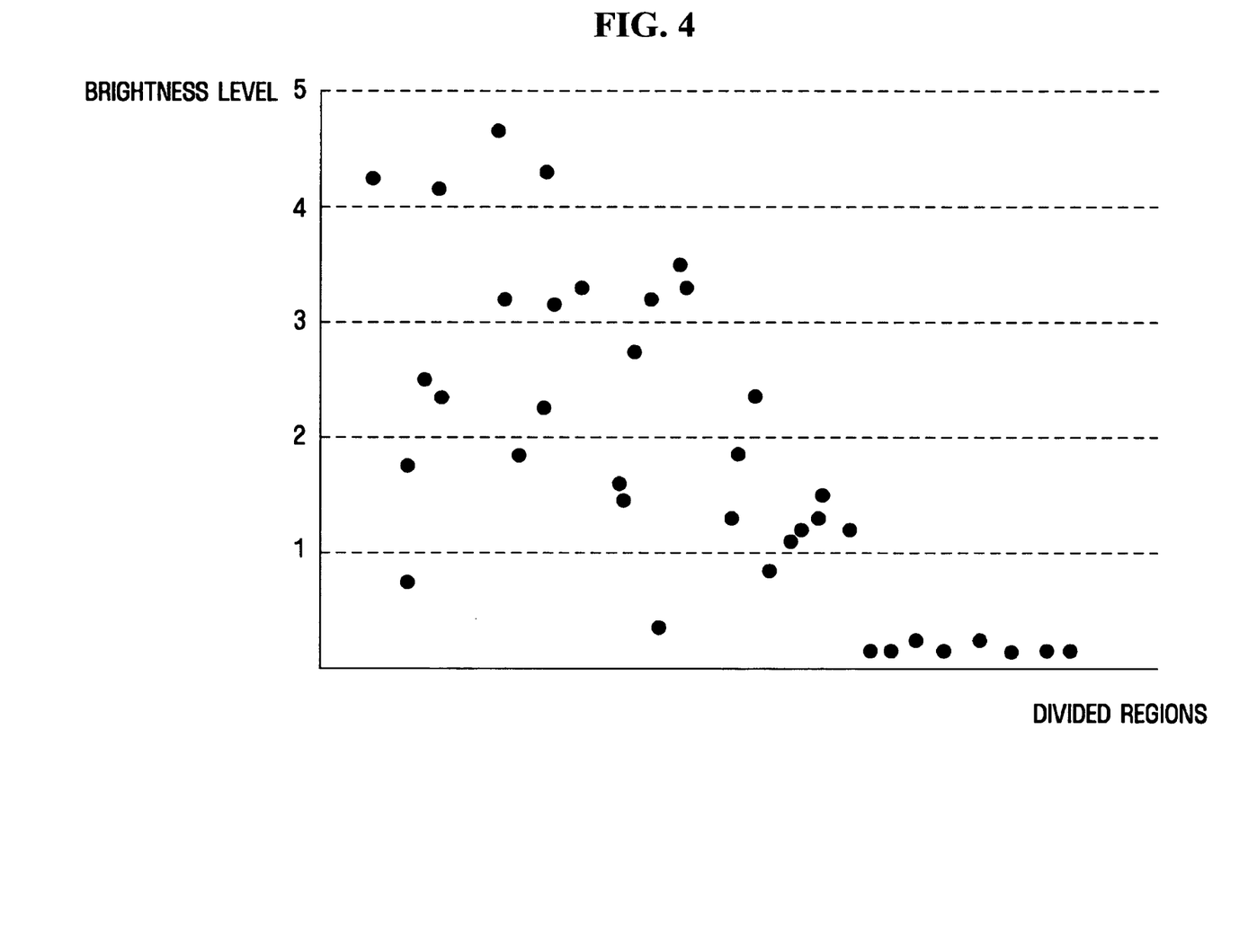
FIG. 4 illustrates a brightness distribution, according to an embodiment of the present invention.

More specifically, in an embodiment, the brightness distribution calculation unit 120, for example, may set levels of brightness as illustrated in FIG. 4, and may further determine to which brightness level the brightness level of each divided region belongs. For example, if the maximum value of brightness set in the brightness distribution calculation unit 120 is 10, and a total of 5 brightness levels with each level having 2 units are set, the brightness distribution calculation unit 120 may determine to which brightness level the brightness of each divided region belongs.

For example, in FIG. 4, a brightness level 1 has brightness values between 0 and 2, and a brightness level 2 has brightness values between 8 and 10.

In addition, in this embodiment of the present invention, the brightness level of a divided region used by the brightness distribution calculation unit 120, for example, may be understood to be the mean brightness level of the divided region, and the brightness range corresponding to each brightness level may vary with respect to an environment in which an image is captured.

Accordingly, the brightness distribution calculation unit 120 may calculate a brightness distribution illustrating the frequencies of divided regions falling within each brightness level. Thus, though not limited thereto, embodiments of the present invention will be explained using a gray level as the brightness level. That is, an example case will be explained in which the image obtained in the brightness distribution calculation unit 120 is transformed to the gray scale, and the brightness distribution is calculated with respect to the brightness level of each divided region.

Here, as noted above, embodiments using such a gray level for the brightness level is just an example to provide an understanding of the present invention, and the types of the brightness level can vary.

Figure 5:
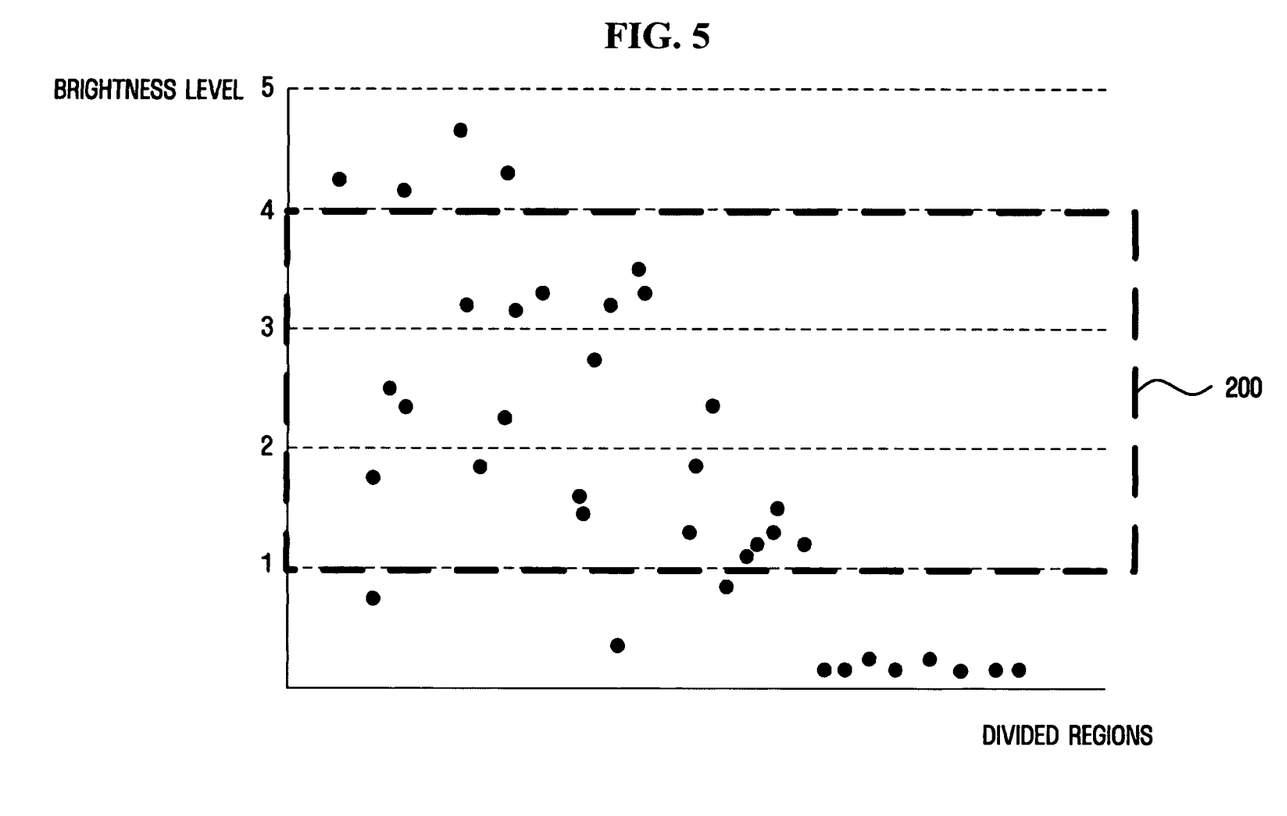
FIG. 5 illustrates a range corresponding to a main region, such as in the brightness distribution illustrated in FIG. 4, according to an embodiment of the present invention.

As illustrated in FIG. 5, the compensation unit 130 may identify a divided region included in a brightness level in a predetermined range 200 in the brightness distribution calculated by the brightness distribution calculation unit 120, e.g., in the brightness distribution illustrated in FIG. 4 described above, as a main region, and identify divided regions not included in the brightness level in the predetermined range 200 as a sub region. Here, the brightness level, e.g., determined as the main region by the compensation unit 130, may be understood as a range excluding a highest brightness level and a lowest brightness level in the calculated brightness distribution calculated in the brightness distribution calculation unit 120. This is because in the case of an image which is captured with sufficient exposure, in general, the brightness level of each divided region can converge on an intermediate brightness level in a calculated brightness distribution. In addition, if compensation of a divided region having a highest brightness level is performed, the compensation may be performed though the brightness is already sufficient enough, thereby making the image even further bright. Accordingly, the image after the compensation may become unnatural. In order to avoid this problem in advance, the such an exclusion may be performed.

Figure 6:
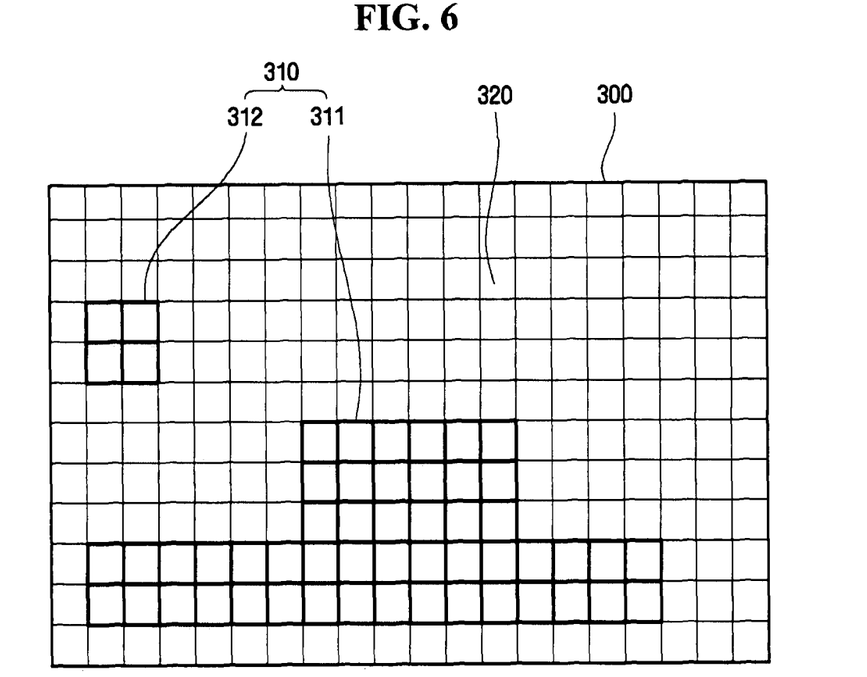
FIG. 6 illustrates divided regions included in main regions, according to an embodiment of the present invention.

Here, the compensation unit 130 may set a group of divided regions 311 and 312, including the predetermined range illustrated in FIG. 5, as a main region 310 in the image 300, e.g., as obtained in the image acquisition unit 110, and set the remaining divided regions as a sub region 320 as illustrated in FIG. 6.

In addition, as illustrated in FIG. 6, the divided region 312 that is not continuous in the divided region group 311 and 312, included in the main region 310, is determined to not be a main object, and may be removed.

In other words, in relation to the operation of the compensation unit 130, when the main object is a house, a tree is near the house in an obtained image, and the divided regions corresponding to the house and the tree, respectively, are in the same range in a calculated brightness distribution, if the user, for example, sets the house as the main object and obtains the image, the divided regions including the area occupied by the house exist continuously, while the divided regions including the area occupied by the tree is not continuous relative to the divided regions including the area occupied by the house. Accordingly, the divided regions that are not continuous may be removed, thereby determining valid divided regions in the main region and enabling compensation.

Figure 7:
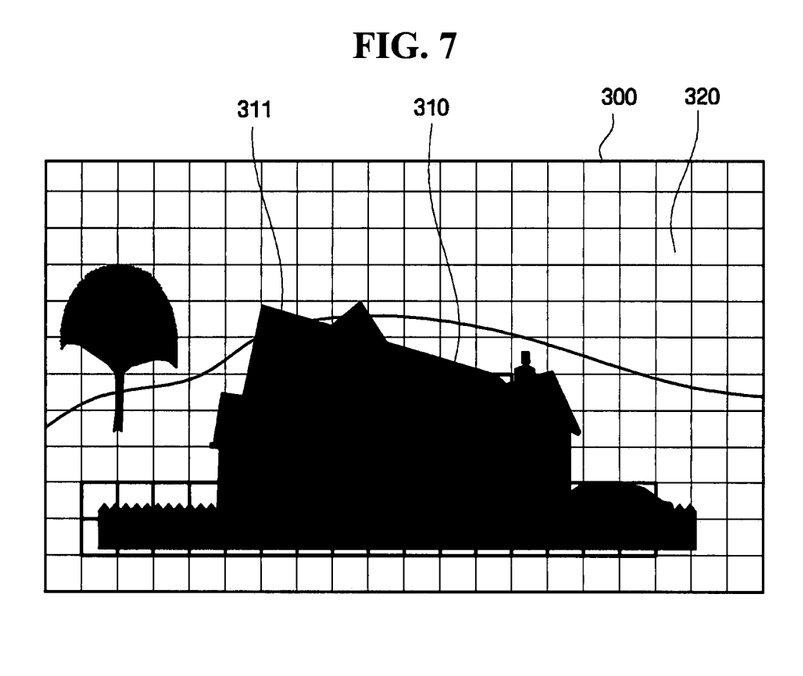
FIG. 7 illustrates valid divided regions illustrated in FIG. 6, according to an embodiment of the present invention.
Figure 8:
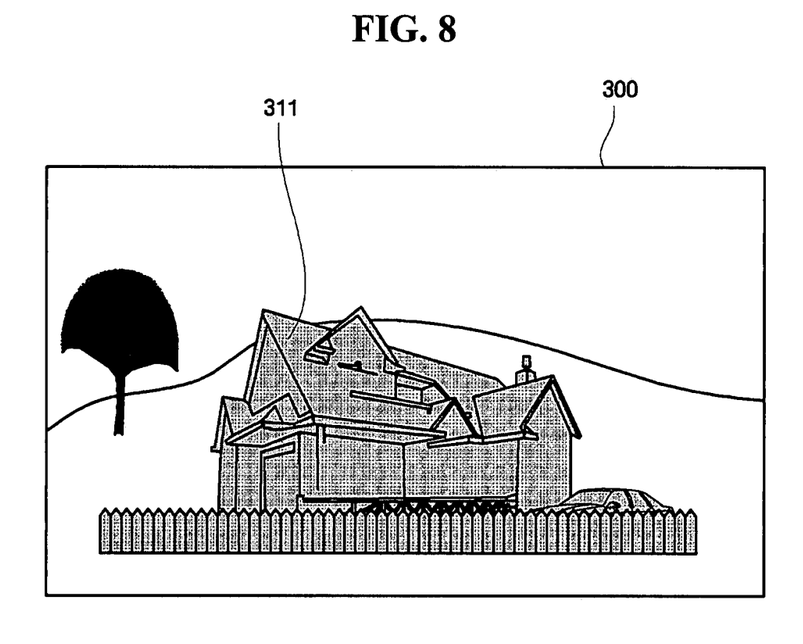
FIG. 8 illustrates an image in which brightness is compensated, e.g., by a system for compensating brightness of an image, according to an embodiment of the present invention.

Accordingly, as illustrated in FIG. 7, the compensation unit 130, for example, may perform compensation of brightness through a weighted sum of the main region 310 and sub region 320, taking the valid divided regions, described above, in the image 300 obtained in the image acquisition unit 110, as the main region, so that the brightness of the obtained image 300 can reach a target brightness level. It can be seen in FIG. 8 that the compensated image 300 has the target brightness level compared to the compensated image illustrated in FIG. 2.

Meanwhile, the compensation unit 130 may perform compensation such that it reduces compensation values for the main region 310 and the sub region 320 as the brightness levels thereof are higher. The reason for the foregoing is that, if bright compensation is performed collectively for all brightness levels without considering the brightness level of each region, the brightness may unduly increase continuously even when a predetermined region is sufficiently bright. Thus, in order to prevent the brightness from increasing continuously, the compensation unit 130 may perform bright compensation such that it reduces compensation values for the main region 310 and the sub region 320 as the brightness levels thereof are higher, as stated above.

Figure 9:
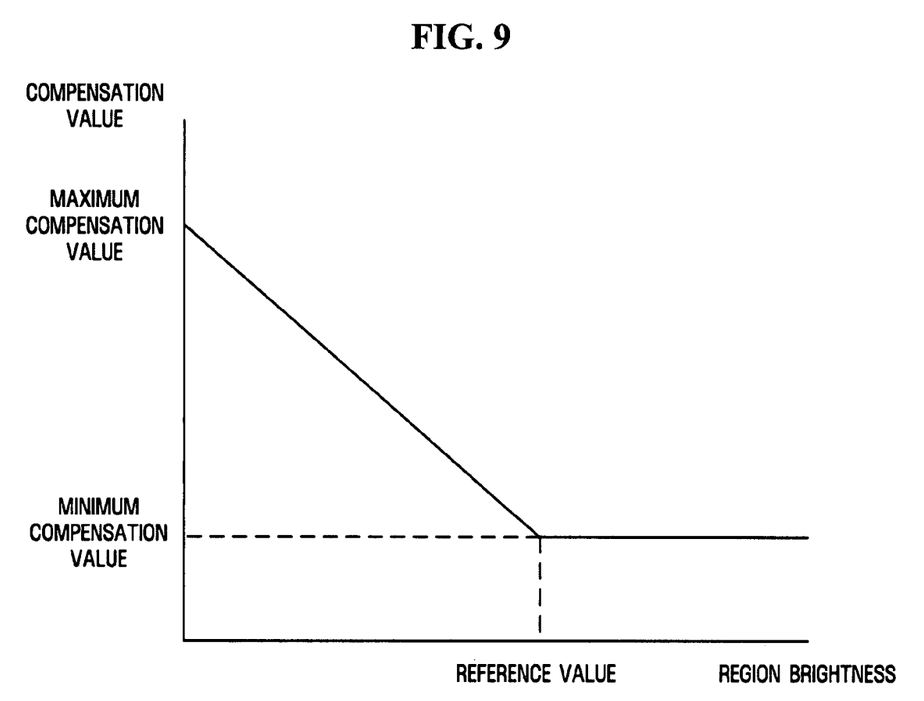
FIG. 9 illustrates compensation values with respect to brightness levels of main regions and sub regions, according to an embodiment of the present invention.

Accordingly, as illustrated in FIG. 9, the compensation unit 130 may set a maximum compensation value and a minimum compensation value, and compensate a region having a brightness level equal to or higher than a predetermined reference value, by using the minimum compensation value. For example, when the brightness level of a sub region is higher than that of the reference value, the minimum compensation value may be identified as a compensation value according to the graph illustrated in FIG. 9. Assuming that the minimum compensation value is 20% and a compensation amount required to make the brightness level of the main object reach a target brightness level is a 10% increase in the brightness level of the entire image, the final compensation amount becomes 10%*20%, thereby making a 2% increase in the brightness level of the entire image. Here, the brightness level of a region indicated in the horizontal axis can be understood as the brightness level of the sub region.

The storage unit 140 may store information on brightness levels used when a brightness distribution is calculated in the brightness distribution calculation unit 120, the image obtained by the image acquisition unit 110, and the image compensated by the compensation unit 130, for example. Here, in one embodiment, information on the brightness levels, the obtained image and the compensated image may all be stored in the storage unit 140. Alternatively, embodiments of the present invention are not limited thereto. For example, the storage unit 140 may not be limited to this, and can be implemented as separate hardware units. Here, as the storage unit 140, devices and/or systems, such as those with a cache, ROM, PROM, EPROM, EEPROM, flash memory, SRAM, and DRAM, can be included, but the storage unit 140 is not limited thereto.

In an embodiment, through the user input unit 150, a user input value may be input, and only when a user input value is input, the compensation unit 130 may perform compensation based on the brightness distribution calculated in the brightness distribution calculation unit 120, noting that alternatives are available. In one example, if the user takes an image of a predetermined subject against light, the user can request compensation of the obtained image through the user input unit 150.

Accordingly, in an embodiment, the compensation unit 130 may always perform compensation using the brightness distribution calculated in the brightness calculation unit 120, or may perform compensation using the brightness distribution only when a user input is input, for example. Here, it should again be noted that embodiments of the present invention, e.g., including such a compensation unit 130, are not limited to the above description. Alternative embodiments are equally available.

Figure 10:
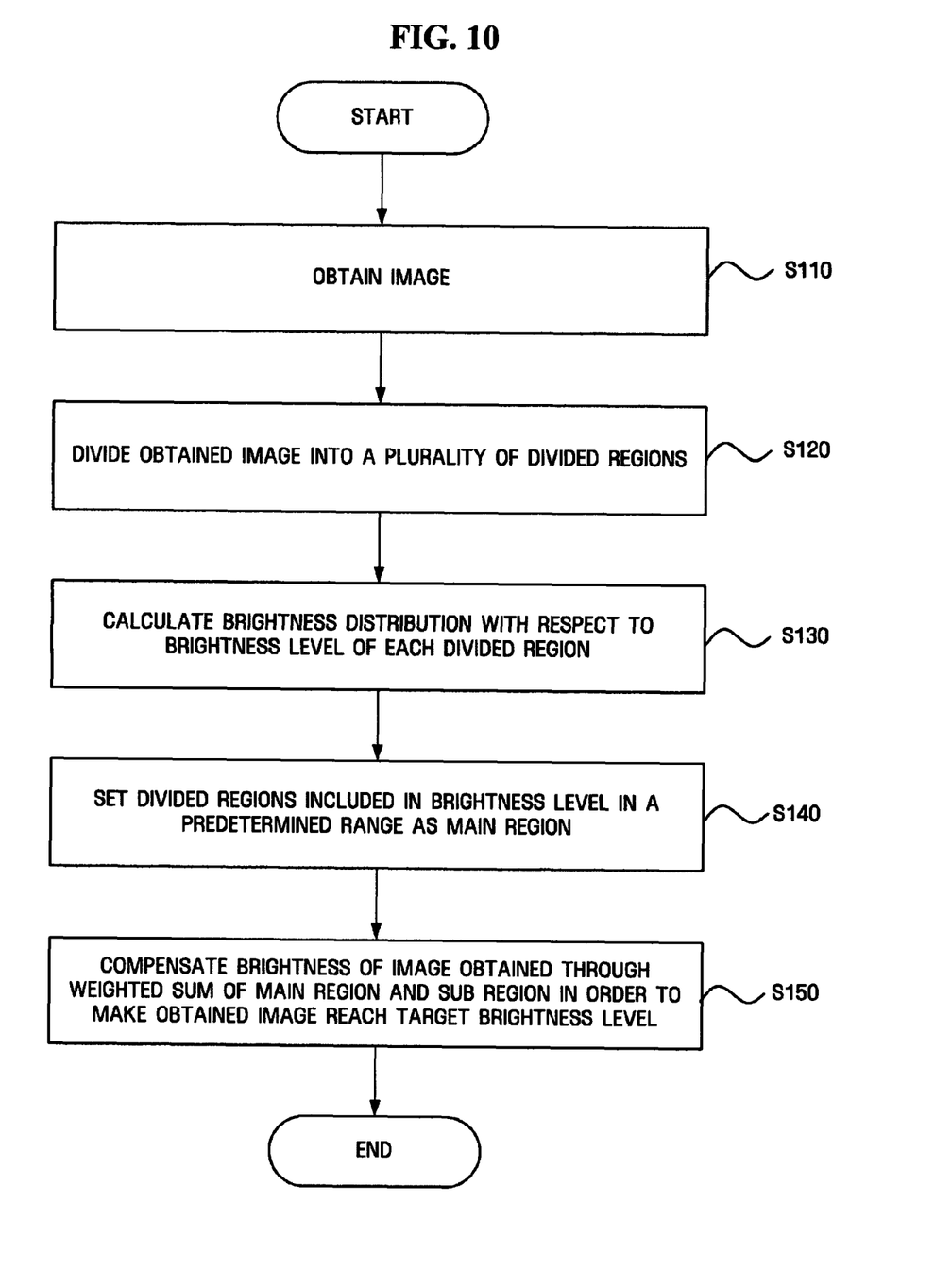
FIG. 10 illustrates a method of compensating brightness of an image, according to an embodiment of the present invention.

FIG. 10 illustrates a method of compensating brightness of an image, according to an embodiment of the present invention. Here, the method of compensating brightness of an image can be understood as just one example of a case where the brightness of an image previously obtained, e.g., according to the conventional fixed-area division method, is compensated, and the method can be applied similarly to the case where the brightness of an image is not previously compensated by such a conventional fixed-area division method.

As illustrated in FIG. 10, an image of a predetermined object may be obtained, e.g., through the image acquisition unit 110, in operation S110. Here, the image obtained by the image acquisition unit 110 may include a main object and a sub object. In addition, though the case where there is one main object is explained in the current embodiment, a plurality of main objects and sub objects can be also included according to circumstances.

The obtained image may be divided into a plurality of divided regions, in operation S120, and the brightness distribution of each divided region may be calculated, e.g., by the brightness distribution calculation unit 120, in operation S130. Here, the case where the divided regions in the current embodiment have the same sizes and compensation, using a fixed main area, is performed before the brightness distribution is calculated in the brightness distribution calculation unit 120, for example, will be used as an example, noting that alternatives are further available. Here, a case where the image obtained through the image acquisition unit 110, for example, is compensated with respect to a target brightness level using a fixed main area will thus be used as an example for further explanation of the present invention.

Thus, the case where when a user requests compensation, e.g., through the user input unit 150, and the brightness distribution calculation unit 120 calculates a brightness distribution will be explained. When an image is captured against the light or under low light, a user may request compensation through the user input unit 150, for example, noting that such user interaction may not be implemented in different embodiments. For example, when an image is captured, a brightness distribution may automatically be calculated or a brightness distribution may automatically be calculated with respect to the state of surrounding light when an image is captured.

Here, after a plurality of brightness levels are set, the brightness distribution calculated in the brightness calculation unit 120, for example, may be expressed for illustrating the frequency of divided regions falling within each brightness level. In addition, in an embodiment, the brightness level of a divided region used for calculating the brightness distribution can be understood as the mean brightness level of the divided region.

A main region, formed with divided regions having brightness levels, respectively corresponding to the calculated brightness distribution, within a predetermined range may be set, e.g., by the compensation unit 130, in operation S140. Here, the divided regions within the set main region can be understood to be regions corresponding to the main object described above. Further, divided regions that are included in the set main region but are not continuous may be removed from the main region. Here, the main region excluding the divided regions not continuous in the set main region will be referred to as a valid main region.

If the valid main region is set, the compensation unit 130, for example, may perform compensation of the brightness of the obtained image, e.g., by allocating weight values to the main region and the sub region and using a weighted sum, in operation S150.

Embodiments of the present invention have been described above with reference to flowchart illustrations of methods. Here, it should be understood that each block of the flowchart illustrations, and combinations of blocks in the flowchart illustrations, may be implemented by computer readable code, e.g., program instructions. This computer readable code may be provided to a processor of a general purpose computer, special purpose computer, or other programmable data processing apparatus to create mechanisms for implementing operations specified in the flowchart block or blocks.

This computer readable code may also be stored in a medium, e.g., a computer usable or computer-readable memory that can direct a computer or other programmable data processing system to operate in a particular manner, such that the instructions implement the operations specified in the flowchart block or blocks. The computer readable code may also be loaded onto a computer or other programmable data processing system to cause a series of operations to be performed on the computer or other programmable system to produce a computer implemented process for implementing the operations specified in the flowchart block or blocks, for example.

In addition, each block may represent a module, a segment, or a portion of code, which may include one or more executable instructions to implement the specified logical operations. It should also be noted that in other implementations, the operations noted in the blocks may occur out of the order noted or in different configurations of hardware and software. For example, two blocks shown in succession may, in fact, be executed substantially concurrently, or the blocks may sometimes be executed in the reverse order, depending on the functionality involved.

Meanwhile, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, operations, attributes, procedures, subroutines, segments of program code, drivers, firmware, microcode, circuitry, data, databases, data structures, tables, arrays, and variables. The capability provided for in the components and modules may be combined into fewer components and modules or further separated into additional components and modules. In addition, the components and modules may be implemented such that they execute one or more computers in a communication system.

With this in mind, embodiments of the present invention can be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention brightness of an image may be compensated, with a main region being set variably with respect to a central object included in an obtained image, thereby solving the insufficient exposure problem.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system compensating the brightness of an image, the system comprising:
   a brightness distribution calculation unit to divide an obtained image into a plurality of divided regions and to calculate a brightness distribution of the plurality of divided regions; and
   a compensation unit to identify a main region, including one or more regions of the plurality of divided regions, including a main object according to the calculated brightness distribution and to compensate the obtained image according to the identification of the main region,
   wherein the brightness distribution identifies a distribution of respective brightness determinations of the plurality of divided regions with respect to available plural brightness levels or ranges.

2. The system of claim 1, further comprising an image acquisition unit to obtain the image.

3. The system of claim 1, wherein the brightness distribution calculation unit calculates the brightness distribution based on a mean brightness level of each divided region, as the respective brightness determinations.

4. The system of claim 1, wherein the brightness distribution calculation unit sets a plurality of brightness levels and calculates the brightness distribution to identify respective frequencies of the plurality of divided regions falling within each of the plural brightness levels or ranges.

5. The system of claim 4, wherein, based on the brightness distribution, the compensation unit identifies a group of divided regions whose respective brightness determinations are within a predetermined brightness range as a set main region.

6. The system, of claim 5, wherein, in the identifying of the main region, the compensation unit identifies to be excluded divided regions of the set main region that are not contiguous to contiguous divided regions of the set main region that include the main object, to identify the main region as being the set main region excluding the to be excluded divided regions.

7. The system of claim 1, further comprising a user input unit to input a user input value, wherein the compensation unit determines whether to compensate the obtained image according to the user input value.

8. The system of claim 1, wherein the compensation unit performs compensation of the obtained image by compensating the obtained image through a predetermined main area before the calculation of the brightness distribution.

9. The system of claim 1, wherein the compensation unit further sets a maximum compensation value and a minimum compensation value and selectively performs compensation of the main region of the obtained image using one of the maximum compensation value and the minimum compensation value based upon the main region having a brightness level meeting a predetermined reference value.

10. A method of compensating brightness of an image, the method comprising:
dividing an obtained image into a plurality of divided regions and calculating a brightness distribution of the plurality of divided regions; and
identifying a main region, including one or more regions of the plurality of divided regions, including a main object according to the calculated brightness distribution, compensating the obtained image according to the identification of the main region, and outputting the compensated obtained image,
wherein the brightness distribution identifies a distribution of respective brightness determinations of the plurality of divided regions with respect to available plural brightness levels or ranges.

11. The method of claim 10, further comprising obtaining the image.

12. The method of claim 10, wherein the calculating of the brightness distribution is based on a mean brightness level of each divided region, as the respective brightness determinations.

13. The method of claim 10, wherein the calculating of the brightness distribution comprises:
setting a plurality of brightness levels; and
calculating the brightness distribution indicating respective frequencies of the plurality of divided regions falling within each of the plural brightness levels or ranges.

14. The method of claim 13, wherein, based on the brightness distribution, the compensating of the obtained image comprises identifying a group of divided regions whose respective brightness determinations are within a predetermined brightness range as a set main region.

15. The method of claim 14, wherein, in the identifying of the main region, the compensating of the obtained image comprises identifying to be excluded divided regions of the set main region that are not contiguous to contiguous divided regions of the set main region that include the main object, to identify the main region as being the set main region excluding the to be excluded divided regions.

16. The method of claim 10, further comprising receiving a user input value, wherein the compensating of the obtained image comprises determining whether to compensate the obtained image according to the user input value.

17. The method of claim 10, wherein the compensating of the obtained image comprises performing compensation of the obtained image by compensating the obtained image through a predetermined main area before the calculating of the brightness distribution.

18. The method of claim 10, wherein the compensating of the obtained image further comprises setting a maximum compensation value and a minimum compensation value and selectively performing compensation of the main region of the obtained image using one of the maximum compensation value and the minimum compensation value based upon the main region having a brightness level meeting a predetermined reference value.

19. At least one non-transitory computer readable recording medium comprising computer readable code to control at least one processing element to implement the method of claim 10.

* * * * *